US010813062B2

(12) United States Patent
Shilov et al.

(10) Patent No.: US 10,813,062 B2
(45) Date of Patent: Oct. 20, 2020

(54) METHODS TO COMMUNICATE PARAMETERS ACROSS MULTIPLE COMPONENT CARRIERS OF A CARRIER AGGREGATION FOR SIDELINK COMMUNICATION

(71) Applicant: Apple Inc., Cupertino, CA (US)

(72) Inventors: Mikhail Shilov, Nizhny Novgorod (RU); Alexey Khoryaev, Nizhny Novgorod (RU); Sergey Panteleev, Nizhny Novgorod (RU)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/376,523

(22) Filed: Apr. 5, 2019

(65) Prior Publication Data

US 2019/0239178 A1    Aug. 1, 2019

Related U.S. Application Data

(60) Provisional application No. 62/653,729, filed on Apr. 6, 2018.

(51) Int. Cl.
*H04W 72/04* (2009.01)
*H04W 56/00* (2009.01)
*H04W 72/02* (2009.01)

(52) U.S. Cl.
CPC ..... *H04W 56/0005* (2013.01); *H04W 56/002* (2013.01); *H04W 72/042* (2013.01); *H04W 72/02* (2013.01); *H04W 72/0406* (2013.01)

(58) Field of Classification Search
CPC .......... H04W 56/0005; H04W 56/002; H04W 72/042; H04W 72/02
See application file for complete search history.

(56) References Cited

U.S. PATENT DOCUMENTS

| 2012/0113866 | A1* | 5/2012 | Tenny .................. H04W 24/10 370/254 |
| 2019/0141647 | A1* | 5/2019 | Nimbalker ........ H04W 72/1289 |
| 2020/0053675 | A1* | 2/2020 | Khoryaev ............... H04L 5/001 |

* cited by examiner

*Primary Examiner* — Wei Zhao
(74) *Attorney, Agent, or Firm* — Kowert, Hood, Munyon, Rankin & Goetzel, P.C.

(57) ABSTRACT

Embodiments of a User Equipment (UE) and methods of communication are generally described herein. The UE may select one or more of the component carriers (CCs) of a carrier aggregation, and may transmit a sidelink synchronization signal (SLSS) and a physical sidelink broadcast channel (PSBCH) on the one or more selected CCs. The UE may encode the PSBCH to include a plurality of parameters related to the sidelink operation, wherein the plurality of parameters are to be propagated across all of the CCs of the plurality of CCs for the sidelink operation. The UE may transmit one or more physical sidelink shared channels (PSSCHs) in accordance with the carrier aggregation, and further in accordance with the plurality of parameters propagated across the plurality of CCs.

20 Claims, 10 Drawing Sheets

METHODS TO COMMUNICATE PARAMETERS ACROSS MULTIPLE COMPONENT CARRIERS OF A CARRIER AGGREGATION FOR SIDELINK COMMUNICATION

PRIORITY CLAIM

This application claims priority under 35 USC 119(e) to U.S. Provisional Patent Application Ser. No. 62/653,729, filed Apr. 6, 2018, which is incorporated herein by reference in its entirety.

TECHNICAL FIELD

Embodiments pertain to wireless networks. Some embodiments relate to cellular communication networks including 3GPP (Third Generation Partnership Project) networks, 3GPP LTE (Long Term Evolution) networks, 3GPP LTE-A (LTE Advanced) networks, New Radio (NR) networks, and 5G networks, although the scope of the embodiments is not limited in this respect. Some embodiments relate to sidelink synchronization. Some embodiments relate to carrier aggregation.

BACKGROUND

Efficient use of the resources of a wireless network is important to provide bandwidth and acceptable response times to the users of the wireless network. However, often there are many devices trying to share the same resources and some devices may be limited by the communication protocol they use or by their hardware bandwidth. Moreover, wireless devices may need to operate with both newer protocols and with legacy device protocols.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
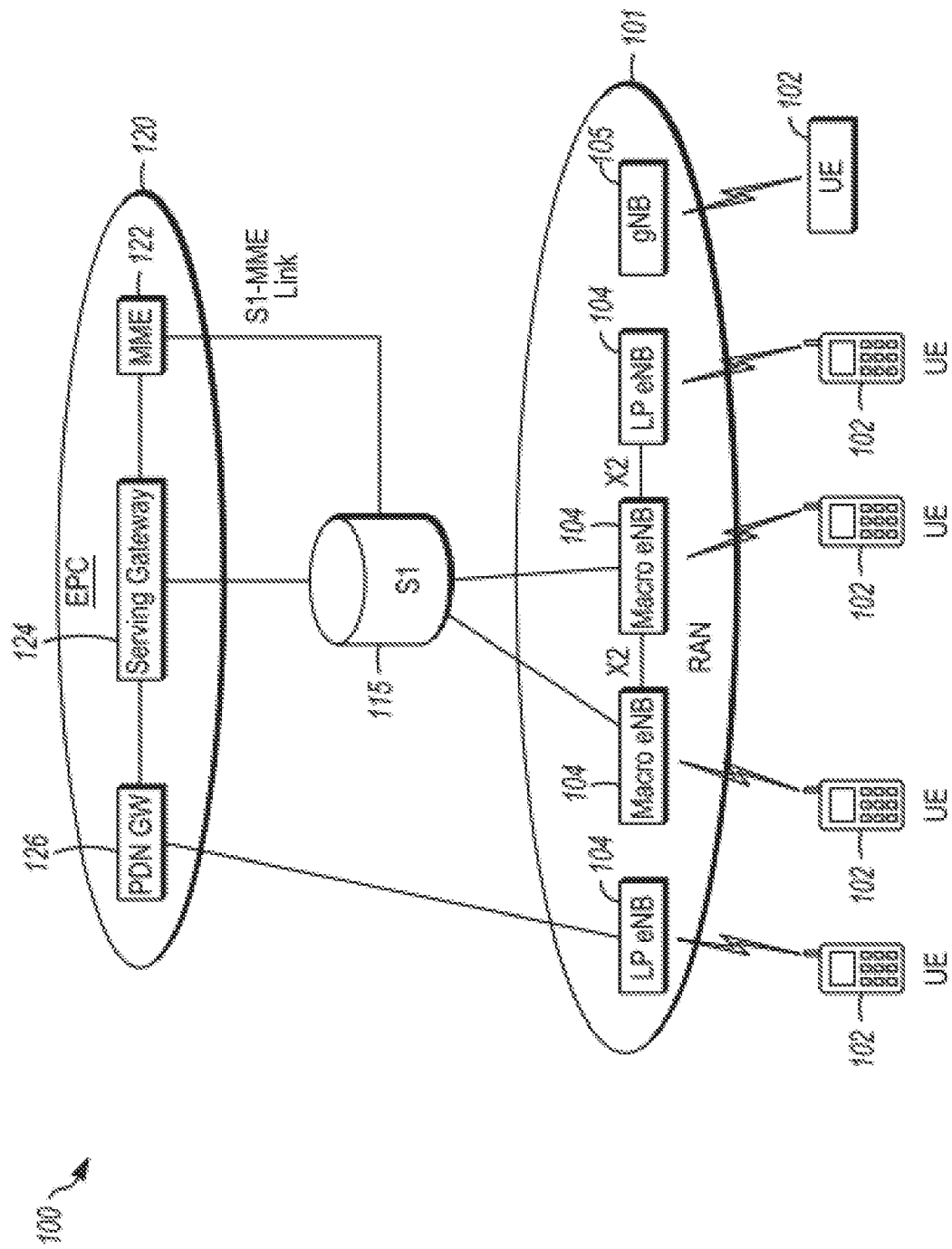
FIG. 1A is a functional diagram of an example network in accordance with some embodiments.
Figure 1B:
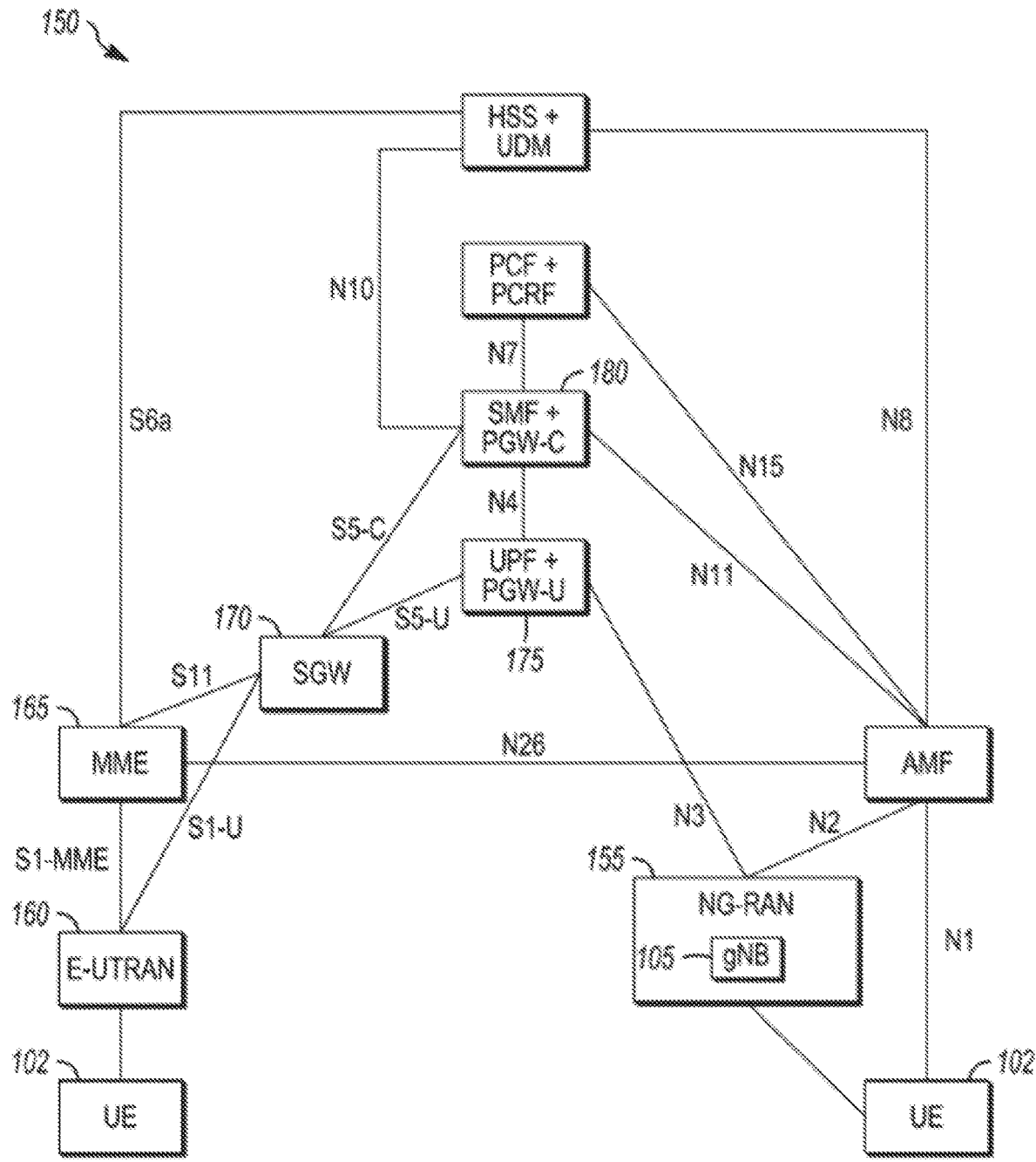
FIG. 1B is a functional diagram of another example network in accordance with some embodiments.

FIG. 1A is a functional diagram of an example network in accordance with some embodiments. FIG. 1B is a functional diagram of another example network in accordance with some embodiments. In references herein, "FIG. 1" may include FIG. 1A and FIG. 1B. In some embodiments, the network 100 may be a Third Generation Partnership Project (3GPP) network. In some embodiments, the network 150 may be a 3GPP network. In a non-limiting example, the network 150 may be a new radio (NR) network. It should be noted that embodiments are not limited to usage of 3GPP networks, however, as other networks may be used in some embodiments. As an example, a Fifth Generation (5G) network may be used in some cases. As another example, a New Radio (NR) network may be used in some cases. As another example, a wireless local area network (WLAN) may be used in some cases. Embodiments are not limited to these example networks, however, as other networks may be used in some embodiments. In some embodiments, a network may include one or more components shown in FIG. 1A. Some embodiments may not necessarily include all components shown in FIG. 1A, and some embodiments may include additional components not shown in FIG. 1A. In some embodiments, a network may include one or more components shown in FIG. 1B. Some embodiments may not necessarily include all components shown in FIG. 1B, and some embodiments may include additional components not shown in FIG. 1B. In some embodiments, a network may include one or more components shown in FIG. 1A and one or more components shown in FIG. 1B. In some embodiments, a network may include one or more components shown in FIG. 1A, one or more components shown in FIG. 1B and one or more additional components.

The network 100 may comprise a radio access network (RAN) 101 and the core network 120 (e.g., shown as an evolved packet core (EPC)) coupled together through an S1 interface 115. For convenience and brevity sake, only a portion of the core network 120, as well as the RAN 101, is shown. In a non-limiting example, the RAN 101 may be an evolved universal terrestrial radio access network (E-UTRAN). In another non-limiting example, the RAN 101 may include one or more components of a New Radio (NR) network. In another non-limiting example, the RAN 101 may include one or more components of an E-UTRAN and one or more components of another network (including but not limited to an NR network).

The core network 120 may include a mobility management entity (MME) 122, a serving gateway (serving GW) 124, and packet data network gateway (PDN GW) 126. In some embodiments, the network 100 may include (and/or support) one or more Evolved Node-B's (eNBs) 104 (which may operate as base stations) for communicating with User Equipment (UE) 102. The eNBs 104 may include macro eNBs and low power (LP) eNBs, in some embodiments.

In some embodiments, the network 100 may include (and/or support) one or more Next Generation Node-B's (gNBs) 105. In some embodiments, one or more eNBs 104 may be configured to operate as gNBs 105. Embodiments are not limited to the number of eNBs 104 shown in FIG. 1A or to the number of gNBs 105 shown in FIG. 1A. In some embodiments, the network 100 may not necessarily include eNBs 104. Embodiments are also not limited to the connectivity of components shown in FIG. 1A.

It should be noted that references herein to an eNB 104 or to a gNB 105 are not limiting. In some embodiments, one or more operations, methods and/or techniques (such as those described herein) may be practiced by a base station component (and/or other component), including but not limited to a gNB 105, an eNB 104, a serving cell, a transmit receive point (TRP) and/or other. In some embodiments, the base station component may be configured to operate in accordance with a New Radio (NR) protocol and/or NR standard, although the scope of embodiments is not limited in this respect. In some embodiments, the base station component may be configured to operate in accordance with a Fifth Generation (5G) protocol and/or 5G standard, although the scope of embodiments is not limited in this respect.

In some embodiments, one or more of the UEs 102, gNBs 105, and/or eNBs 104 may be configured to operate in accordance with an NR protocol and/or NR techniques. References to a UE 102, eNB 104, and/or gNB 105 as part of descriptions herein are not limiting. For instance, descriptions of one or more operations, techniques and/or methods practiced by a gNB 105 are not limiting. In some embodiments, one or more of those operations, techniques and/or methods may be practiced by an eNB 104 and/or other base station component.

In some embodiments, the UE 102 may transmit signals (data, control and/or other) to the gNB 105, and may receive signals (data, control and/or other) from the gNB 105. In some embodiments, the UE 102 may transmit signals (data, control and/or other) to the eNB 104, and may receive signals (data, control and/or other) from the eNB 104. These embodiments will be described in more detail below.

The MME 122 is similar in function to the control plane of legacy Serving GPRS Support Nodes (SGSN). The MME 122 manages mobility aspects in access such as gateway selection and tracking area list management. The serving GW 124 terminates the interface toward the RAN 101, and routes data packets between the RAN 101 and the core network 120. In addition, it may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 terminates an SGi interface toward the packet data network (PDN). The PDN GW 126 routes data packets between the EPC 120 and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW 126 and the serving GW 124 may be implemented in one physical node or separated physical nodes.

In some embodiments, the eNBs 104 (macro and micro) terminate the air interface protocol and may be the first point of contact for a UE 102. In some embodiments, an eNB 104 may fulfill various logical functions for the network 100, including but not limited to RNC (radio network controller functions) such as radio bearer management, uplink and downlink dynamic radio resource management and data packet scheduling, and mobility management.

In some embodiments, UEs 102 may be configured to communicate Orthogonal Frequency Division Multiplexing (OFDM) communication signals with an eNB 104 and/or gNB 105 over a multicarrier communication channel in accordance with an Orthogonal Frequency Division Multiple Access (OFDMA) communication technique. In some embodiments, eNBs 104 and/or gNBs 105 may be configured to communicate OFDM communication signals with a UE 102 over a multicarrier communication channel in accordance with an OFDMA communication technique. The OFDM signals may comprise a plurality of orthogonal subcarriers.

The S1 interface 115 is the interface that separates the RAN 101 and the EPC 120. It may be split into two parts: the S1-U, which carries traffic data between the eNBs 104 and the serving GW 124, and the S1-MME, which is a signaling interface between the eNBs 104 and the MME 122. The X2 interface is the interface between eNBs 104. The X2 interface comprises two parts, the X2-C and X2-U. The X2-C is the control plane interface between the eNBs 104, while the X2-U is the user plane interface between the eNBs 104.

In some embodiments, similar functionality and/or connectivity described for the eNB 104 may be used for the gNB 105, although the scope of embodiments is not limited in this respect. In a non-limiting example, the S1 interface 115 (and/or similar interface) may be split into two parts: the S1-U, which carries traffic data between the gNBs 105 and the serving GW 124, and the S1-MME, which is a signaling interface between the gNBs 104 and the MME 122. The X2 interface (and/or similar interface) may enable communication between eNBs 104, communication between gNBs 105 and/or communication between an eNB 104 and a gNB 105.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell. In some embodiments, various types of gNBs 105 may be used, including but not limited to one or more of the eNB types described above.

In some embodiments, the network 150 may include one or more components configured to operate in accordance with one or more 3GPP standards, including but not limited to an NR standard. The network 150 shown in FIG. 1B may include a next generation RAN (NG-RAN) 155, which may include one or more gNBs 105. In some embodiments, the network 150 may include the E-UTRAN 160, which may include one or more eNBs. The E-UTRAN 160 may be similar to the RAN 101 described herein, although the scope of embodiments is not limited in this respect.

In some embodiments, the network 150 may include the MME 165. The MME 165 may be similar to the MME 122 described herein, although the scope of embodiments is not limited in this respect. The MME 165 may perform one or more operations or functionality similar to those described herein regarding the MME 122, although the scope of embodiments is not limited in this respect.

In some embodiments, the network 150 may include the SGW 170. The SGW 170 may be similar to the SGW 124 described herein, although the scope of embodiments is not limited in this respect. The SGW 170 may perform one or more operations or functionality similar to those described herein regarding the SGW 124, although the scope of embodiments is not limited in this respect.

In some embodiments, the network 150 may include component(s) and/or module(s) for functionality for a user plane function (UPF) and user plane functionality for PGW (PGW-U), as indicated by 175. In some embodiments, the network 150 may include component(s) and/or module(s) for functionality for a session management function (SMF) and control plane functionality for PGW (PGW-C), as indicated by 180. In some embodiments, the component(s) and/or module(s) indicated by 175 and/or 180 may be similar to the PGW 126 described herein, although the scope of embodiments is not limited in this respect. The component(s) and/or module(s) indicated by 175 and/or 180 may perform one or more operations or functionality similar to those described herein regarding the PGW 126, although the scope of embodiments is not limited in this respect. One or both of the components 170, 172 may perform at least a portion of the functionality described herein for the PGW 126, although the scope of embodiments is not limited in this respect.

Embodiments are not limited to the number or type of components shown in FIG. 1B. Embodiments are also not limited to the connectivity of components shown in FIG. 1B.

In some embodiments, a downlink resource grid may be used for downlink transmissions from an eNB 104 to a UE 102, while uplink transmission from the UE 102 to the eNB 104 may utilize similar techniques. In some embodiments, a downlink resource grid may be used for downlink transmissions from a gNB 105 to a UE 102, while uplink transmission from the UE 102 to the gNB 105 may utilize similar techniques. The grid may be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid correspond to one OFDM symbol and one OFDM subcarrier, respectively. The duration of the resource grid in the time domain corresponds to one slot in a radio frame. The smallest time-frequency unit in a resource grid is denoted as a resource element (RE). There are several different physical downlink channels that are conveyed using such resource blocks. With particular relevance to this disclosure, two of these physical downlink channels are the physical downlink shared channel and the physical down link control channel.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 2:
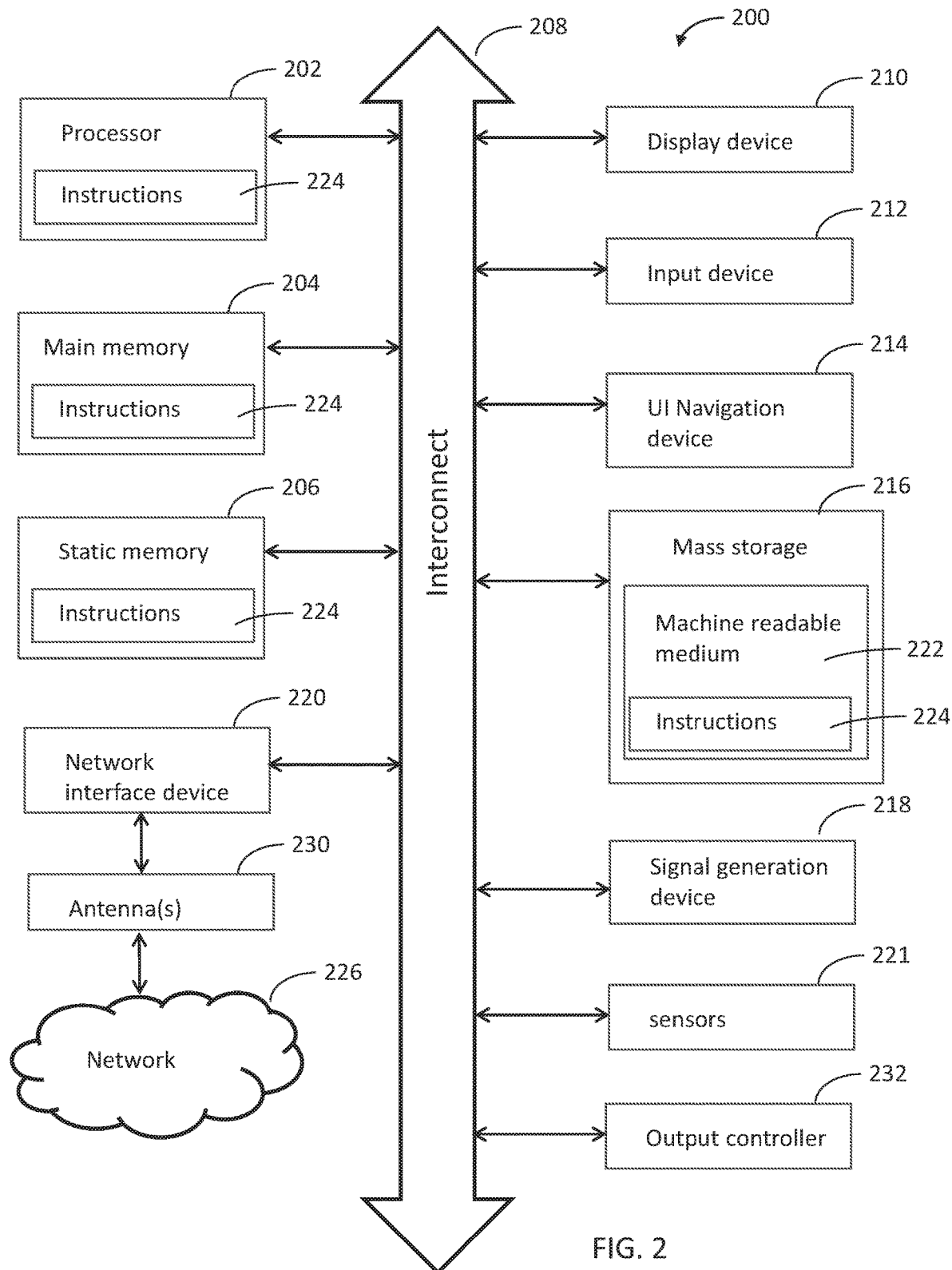
FIG. 2 illustrates a block diagram of an example machine in accordance with some embodiments.

FIG. 2 illustrates a block diagram of an example machine in accordance with some embodiments. The machine 200 is an example machine upon which any one or more of the techniques and/or methodologies discussed herein may be performed. In alternative embodiments, the machine 200 may operate as a standalone device or may be connected (e.g., networked) to other machines. In a networked deployment, the machine 200 may operate in the capacity of a server machine, a client machine, or both in server-client network environments. In an example, the machine 200 may act as a peer machine in peer-to-peer (P2P) (or other distributed) network environment. The machine 200 may be a UE 102, eNB 104, gNB 105, access point (AP), station (STA), user, device, mobile device, base station, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The machine (e.g., computer system) 200 may include a hardware processor 202 (e.g., a central processing unit (CPU), a graphics processing unit (GPU), a hardware processor core, or any combination thereof), a main memory 204 and a static memory 206, some or all of which may communicate with each other via an interlink (e.g., bus) 208. The machine 200 may further include a display unit 210, an alphanumeric input device 212 (e.g., a keyboard), and a user interface (UI) navigation device 214 (e.g., a mouse). In an example, the display unit 210, input device 212 and UI navigation device 214 may be a touch screen display. The machine 200 may additionally include a storage device (e.g., drive unit) 216, a signal generation device 218 (e.g., a speaker), a network interface device 220, and one or more sensors 221, such as a global positioning system (GPS) sensor, compass, accelerometer, or other sensor. The machine 200 may include an output controller 228, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a machine readable medium 222 on which is stored one or more sets of data structures or instructions 224 (e.g., software) embodying or utilized by any one or more of the techniques or functions described herein. The instructions 224 may also reside, completely or at least partially, within the main memory 204, within static memory 206, or within the hardware processor 202 during execution thereof by the machine 200. In an example, one or any combination of the hardware processor 202, the main memory 204, the static memory 206, or the storage device 216 may constitute machine readable media. In some embodiments, the machine readable medium may be or may include a non-transitory computer-readable storage medium. In some embodiments, the machine readable medium may be or may include a computer-readable storage medium.

While the machine readable medium 222 is illustrated as a single medium, the term "machine readable medium" may include a single medium or multiple media (e.g., a centralized or distributed database, and/or associated caches and servers) configured to store the one or more instructions 224. The term "machine readable medium" may include any medium that is capable of storing, encoding, or carrying instructions for execution by the machine 200 and that cause the machine 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 224 may further be transmitted or received over a communications network 226 using a transmission medium via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 220 may include one or more physical jacks (e.g., Ethernet, coaxial, or phone jacks) or one or more antennas to connect to the communications network 226. In an example, the network interface device 220 may include a plurality of antennas to wirelessly communicate using at least one of single-input multiple-output (SIMO), multiple-input multiple-output (MIMO), or multiple-input single-output (MISO) techniques. In some examples, the network interface device 220 may wirelessly communicate using Multiple User MIMO techniques. The term "transmission medium" shall be taken to include any intangible medium that is capable of storing, encoding or carrying instructions for execution by the machine 200, and includes digital or analog communications signals or other intangible medium to facilitate communication of such software.

Figure 3:
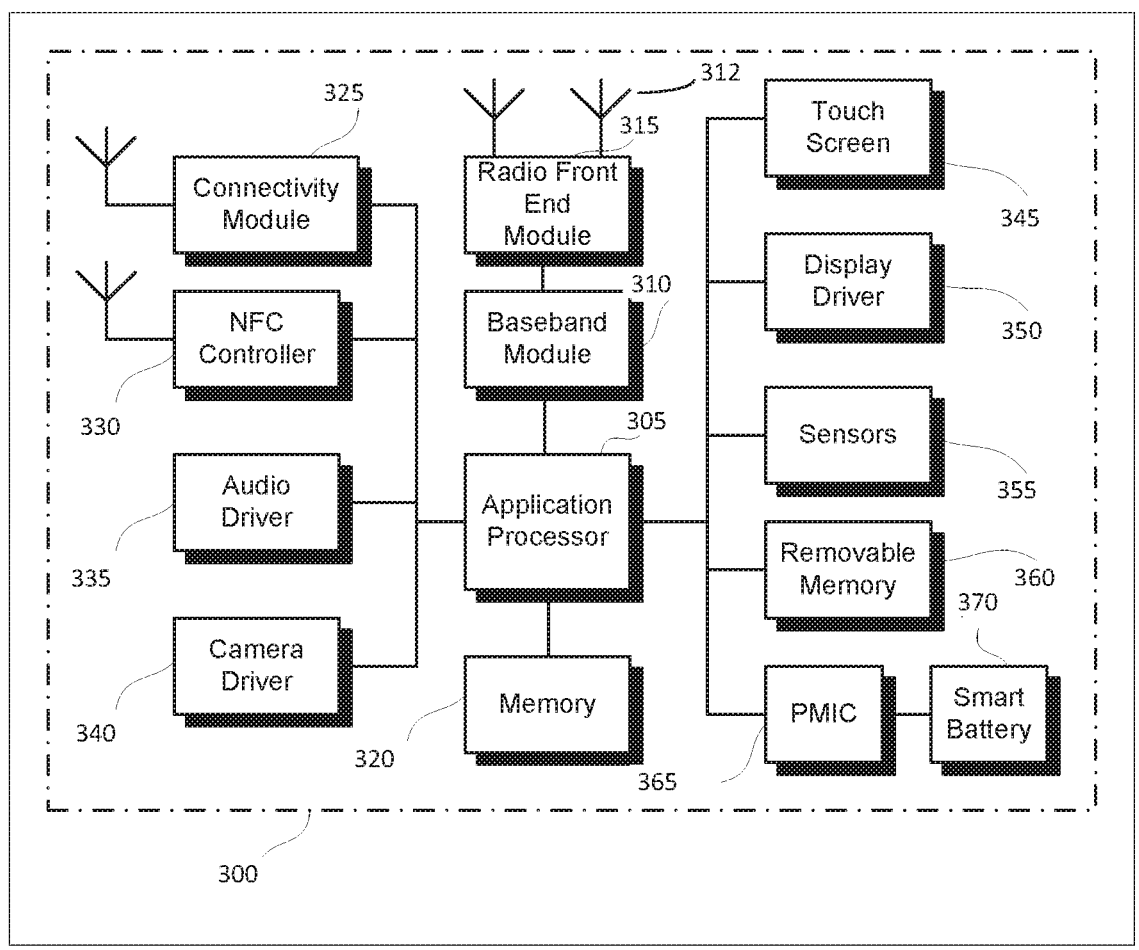
FIG. 3 illustrates a user device in accordance with some aspects.

FIG. 3 illustrates a user device in accordance with some aspects. In some embodiments, the user device 300 may be a mobile device. In some embodiments, the user device 300 may be or may be configured to operate as a User Equipment (UE). In some embodiments, the user device 300 may be arranged to operate in accordance with a new radio (NR) protocol. In some embodiments, the user device 300 may be arranged to operate in accordance with a Third Generation Partnership Protocol (3GPP) protocol. The user device 300 may be suitable for use as a UE 102 as depicted in FIG. 1, in some embodiments. It should be noted that in some embodiments, a UE, an apparatus of a UE, a user device or an apparatus of a user device may include one or more of the components shown in one or more of FIGS. 2, 3, and 5. In some embodiments, such a UE, user device and/or apparatus may include one or more additional components.

In some aspects, the user device 300 may include an application processor 305, baseband processor 310 (also referred to as a baseband module), radio front end module (RFEM) 315, memory 320, connectivity module 325, near field communication (NFC) controller 330, audio driver 335, camera driver 340, touch screen 345, display driver 350, sensors 355, removable memory 360, power management integrated circuit (PMIC) 365 and smart battery 370. In some aspects, the user device 300 may be a User Equipment (UE).

In some aspects, application processor 305 may include, for example, one or more CPU cores and one or more of cache memory, low drop-out voltage regulators (LDOs), interrupt controllers, serial interfaces such as serial peripheral interface (SPI), inter-integrated circuit ($I^2C$) or universal programmable serial interface module, real time clock (RTC), timer-counters including interval and watchdog timers, general purpose input-output (IO), memory card controllers such as secure digital/multi-media card (SD/MMC) or similar, universal serial bus (USB) interfaces, mobile industry processor interface (MIPI) interfaces and Joint Test Access Group (JTAG) test access ports.

In some aspects, baseband module 310 may be implemented, for example, as a solder-down substrate including one or more integrated circuits, a single packaged integrated circuit soldered to a main circuit board, and/or a multi-chip module containing two or more integrated circuits.

Figure 4:
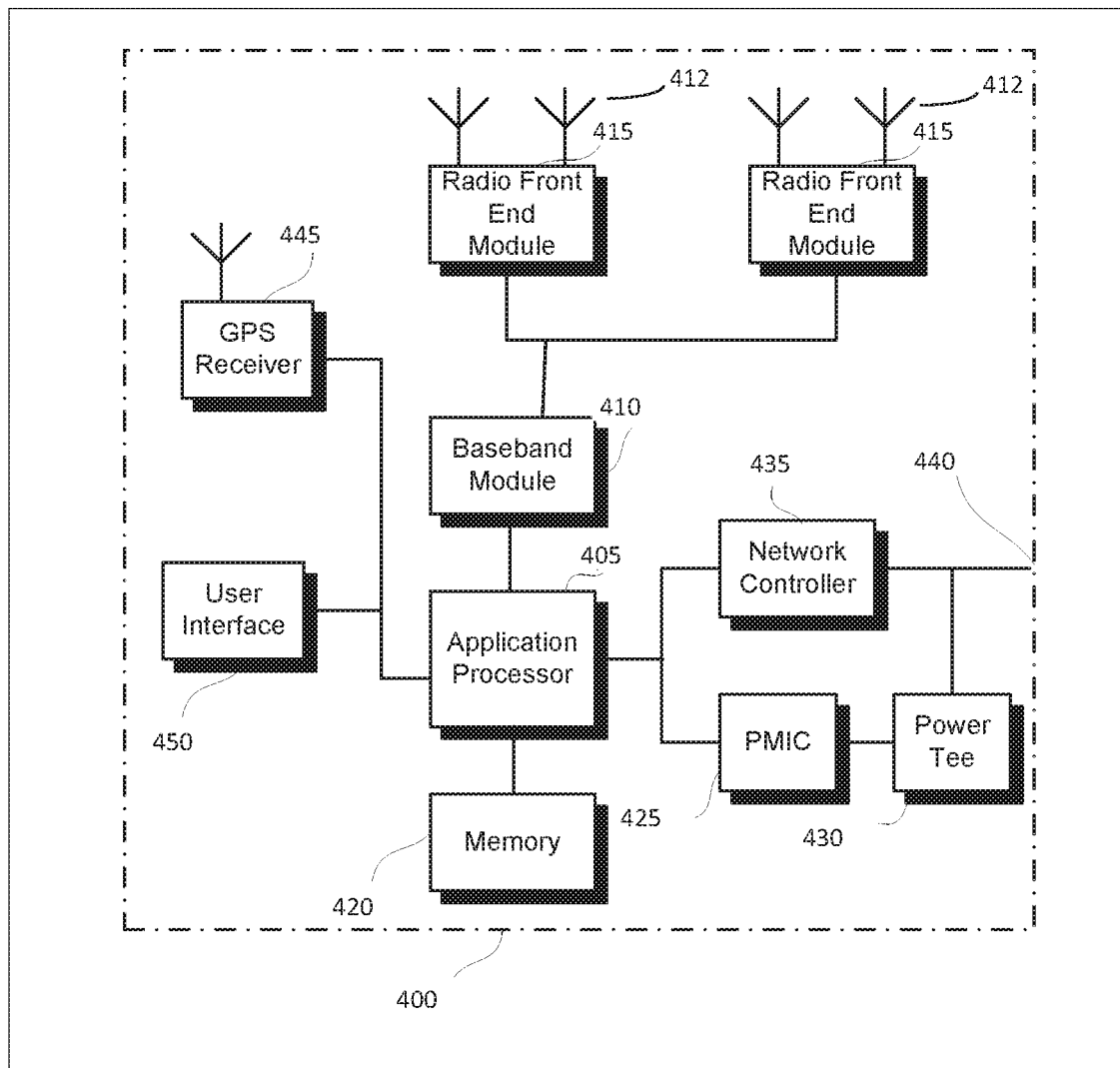
FIG. 4 illustrates a base station in accordance with some aspects.

FIG. 4 illustrates a base station in accordance with some aspects. In some embodiments, the base station 400 may be or may be configured to operate as an Evolved Node-B (eNB). In some embodiments, the base station 400 may be or may be configured to operate as a Next Generation Node-B (gNB). In some embodiments, the base station 400 may be arranged to operate in accordance with a new radio (NR) protocol. In some embodiments, the base station 400 may be arranged to operate in accordance with a Third Generation Partnership Protocol (3GPP) protocol. It should be noted that in some embodiments, the base station 400 may be a stationary non-mobile device. The base station 400 may be suitable for use as an eNB 104 as depicted in FIG. 1, in some embodiments. The base station 400 may be suitable for use as a gNB 105 as depicted in FIG. 1, in some embodiments. It should be noted that in some embodiments, an eNB, an apparatus of an eNB, a gNB, an apparatus of a gNB, a base station and/or an apparatus of a base station may include one or more of the components shown in one or more of FIGS. 2, 4, and 5. In some embodiments, such an eNB, gNB, base station and/or apparatus may include one or more additional components.

FIG. 4 illustrates a base station or infrastructure equipment radio head 400 in accordance with some aspects. The base station 400 may include one or more of application processor 405, baseband modules 410, one or more radio front end modules 415, memory 420, power management circuitry 425, power tee circuitry 430, network controller 435, network interface connector 440, satellite navigation receiver module 445, and user interface 450. In some aspects, the base station 400 may be an Evolved Node-B (eNB), which may be arranged to operate in accordance with a 3GPP protocol, new radio (NR) protocol and/or Fifth Generation (5G) protocol. In some aspects, the base station 400 may be a Next Generation Node-B (gNB), which may be arranged to operate in accordance with a 3GPP protocol, new radio (NR) protocol and/or Fifth Generation (5G) protocol.

In some aspects, application processor 405 may include one or more CPU cores and one or more of cache memory, low drop-out voltage regulators (LDOs), interrupt controllers, serial interfaces such as SPI, I²C or universal programmable serial interface module, real time clock (RTC), timer-counters including interval and watchdog timers, general purpose IO, memory card controllers such as SD/MMC or similar, USB interfaces, MIPI interfaces and Joint Test Access Group (JTAG) test access ports.

In some aspects, baseband processor 410 may be implemented, for example, as a solder-down substrate including one or more integrated circuits, a single packaged integrated circuit soldered to a main circuit board or a multi-chip module containing two or more integrated circuits.

In some aspects, memory 420 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magneto-resistive random access memory (MRAM) and/or a three-dimensional cross-point memory. Memory 420 may be implemented as one or more of solder down packaged integrated circuits, socketed memory modules and plug-in memory cards.

In some aspects, power management integrated circuitry 425 may include one or more of voltage regulators, surge protectors, power alarm detection circuitry and one or more backup power sources such as a battery or capacitor. Power alarm detection circuitry may detect one or more of brown out (under-voltage) and surge (over-voltage) conditions.

In some aspects, power tee circuitry 430 may provide for electrical power drawn from a network cable to provide both power supply and data connectivity to the base station 400 using a single cable. In some aspects, network controller 435 may provide connectivity to a network using a standard network interface protocol such as Ethernet. Network connectivity may be provided using a physical connection which is one of electrical (commonly referred to as copper interconnect), optical or wireless.

In some aspects, satellite navigation receiver module 445 may include circuitry to receive and decode signals transmitted by one or more navigation satellite constellations such as the global positioning system (GPS), Globalnaya Navigatsionnaya Sputnikovaya Sistema (GLONASS), Galileo and/or BeiDou. The receiver 445 may provide data to application processor 405 which may include one or more of position data or time data. Application processor 405 may use time data to synchronize operations with other radio base stations. In some aspects, user interface 450 may include one or more of physical or virtual buttons, such as a reset button, one or more indicators such as light emitting diodes (LEDs) and a display screen.

Figure 5:
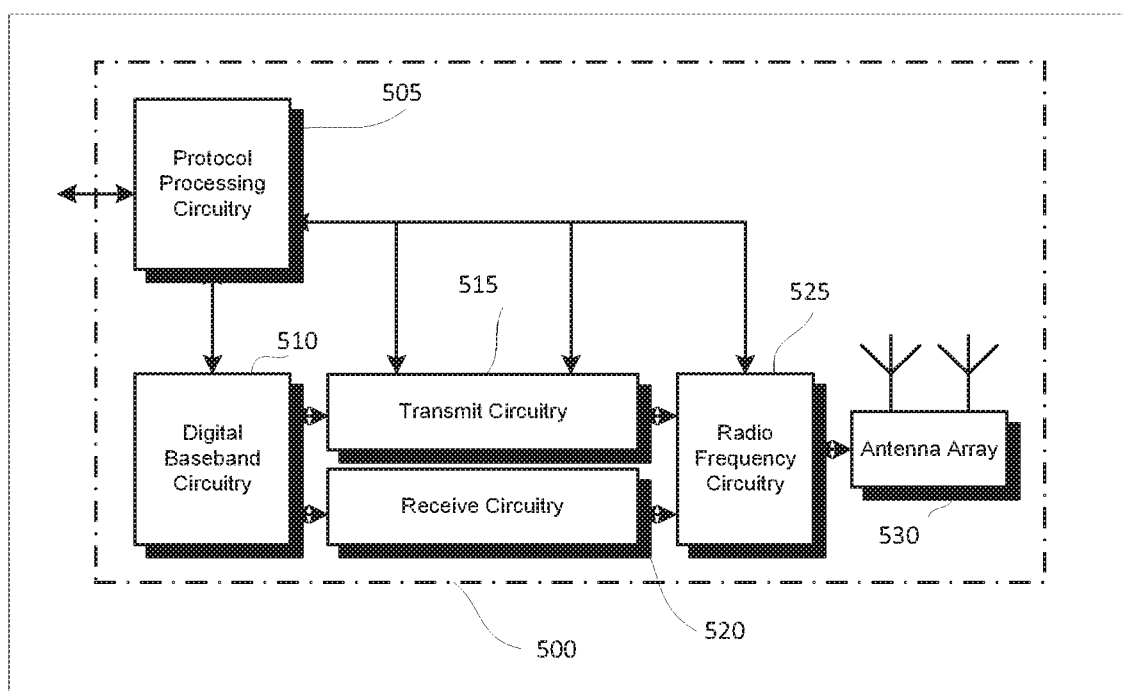
FIG. 5 illustrates an exemplary communication circuitry according to some aspects.

FIG. 5 illustrates an exemplary communication circuitry according to some aspects. Circuitry 500 is alternatively grouped according to functions. Components as shown in 500 are shown here for illustrative purposes and may include other components not shown here in FIG. 5. In some aspects, the communication circuitry 500 may be used for millimeter wave communication, although aspects are not limited to millimeter wave communication. Communication at any suitable frequency may be performed by the communication circuitry 500 in some aspects.

It should be noted that a device, such as a UE 102, eNB 104, gNB 105, the user device 300, the base station 400, the machine 200 and/or other device may include one or more components of the communication circuitry 500, in some aspects.

The communication circuitry 500 may include protocol processing circuitry 505, which may implement one or more of medium access control (MAC), radio link control (RLC), packet data convergence protocol (PDCP), radio resource control (RRC) and non-access stratum (NAS) functions. Protocol processing circuitry 505 may include one or more processing cores (not shown) to execute instructions and one or more memory structures (not shown) to store program and data information.

The communication circuitry 500 may further include digital baseband circuitry 510, which may implement physical layer (PHY) functions including one or more of hybrid automatic repeat request (HARQ) functions, scrambling and/or descrambling, coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, and other related functions.

The communication circuitry 500 may further include transmit circuitry 515, receive circuitry 520 and/or antenna array circuitry 530. The communication circuitry 500 may further include radio frequency (RF) circuitry 525. In an aspect of the disclosure, RF circuitry 525 may include multiple parallel RF chains for one or more of transmit or receive functions, each connected to one or more antennas of the antenna array 530.

In an aspect of the disclosure, protocol processing circuitry 505 may include one or more instances of control circuitry (not shown) to provide control functions for one or more of digital baseband circuitry 510, transmit circuitry 515, receive circuitry 520, and/or radio frequency circuitry 525.

In some embodiments, processing circuitry may perform one or more operations described herein and/or other operation(s). In a non-limiting example, the processing circuitry may include one or more components such as the processor 202, application processor 305, baseband module 310, application processor 405, baseband module 410, protocol processing circuitry 505, digital baseband circuitry 510, similar component(s) and/or other component(s).

In some embodiments, a transceiver may transmit one or more elements (including but not limited to those described herein) and/or receive one or more elements (including but not limited to those described herein). In a non-limiting example, the transceiver may include one or more components such as the radio front end module 315, radio front end module 415, transmit circuitry 515, receive circuitry 520, radio frequency circuitry 525, similar component(s) and/or other component(s).

One or more antennas (such as 230, 312, 412, 530 and/or others) may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, one or more of the antennas (such as 230, 312, 412, 530 and/or others) may be effectively separated to take advantage of spatial diversity and the different channel characteristics that may result.

In some embodiments, the UE 102, eNB 104, gNB 105, user device 300, base station 400, machine 200 and/or other device described herein may be a mobile device and/or portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a wearable device such as a medical device (e.g., a heart rate monitor, a blood pressure monitor, etc.), or other device that may receive and/or transmit information wirelessly. In some embodiments, the UE 102, eNB 104, gNB 105, user device 300, base station 400, machine 200 and/or other device described herein may be configured to operate in accordance with 3GPP standards, although the scope of the embodiments is not limited in this respect. In some embodiments, the UE 102, eNB 104, gNB 105, user device 300, base station 400, machine 200 and/or other device described herein may be configured to operate in accordance with new radio (NR) standards, although the scope of the embodiments is not limited in this respect. In some embodiments, the UE 102, eNB 104, gNB 105, user device 300, base station 400, machine 200 and/or other device described herein may be configured to operate according to other protocols or standards, including IEEE 802.11 or other IEEE standards. In some embodiments, the UE 102, eNB 104, gNB 105, user device 300, base station 400, machine 200 and/or other device described herein may include one or more of a keyboard, a display, a non-volatile memory port, multiple antennas, a graphics processor, an application processor, speakers, and other mobile device elements. The display may be an LCD screen including a touch screen.

Although the UE 102, eNB 104, gNB 105, user device 300, base station 400, machine 200 and/or other device described herein may each be illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

It should be noted that in some embodiments, an apparatus of the UE 102, eNB 104, gNB 105, machine 200, user device 300 and/or base station 400 may include various components shown in FIGS. 2-5. Accordingly, techniques and operations described herein that refer to the UE 102 may be applicable to an apparatus of a UE. In addition, techniques and operations described herein that refer to the eNB 104 may be applicable to an apparatus of an eNB. In addition, techniques and operations described herein that refer to the gNB 105 may be applicable to an apparatus of a gNB.

Figure 6:
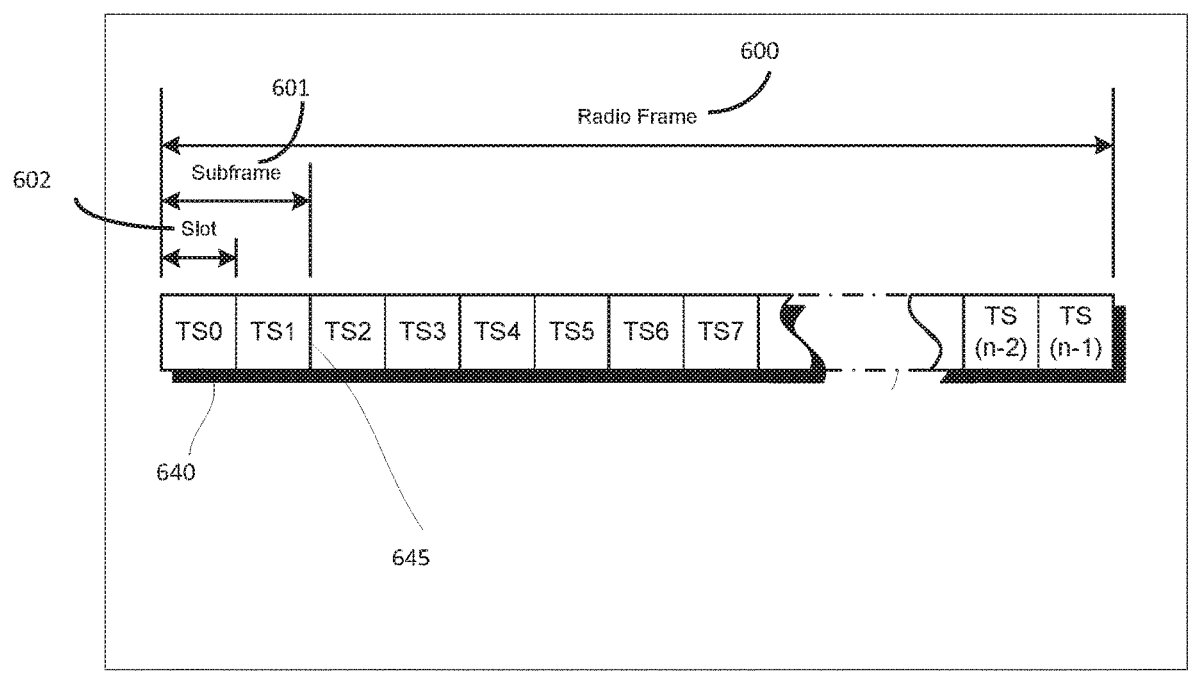
FIG. 6 illustrates an example of a radio frame structure in accordance with some embodiments.
Figure 7:
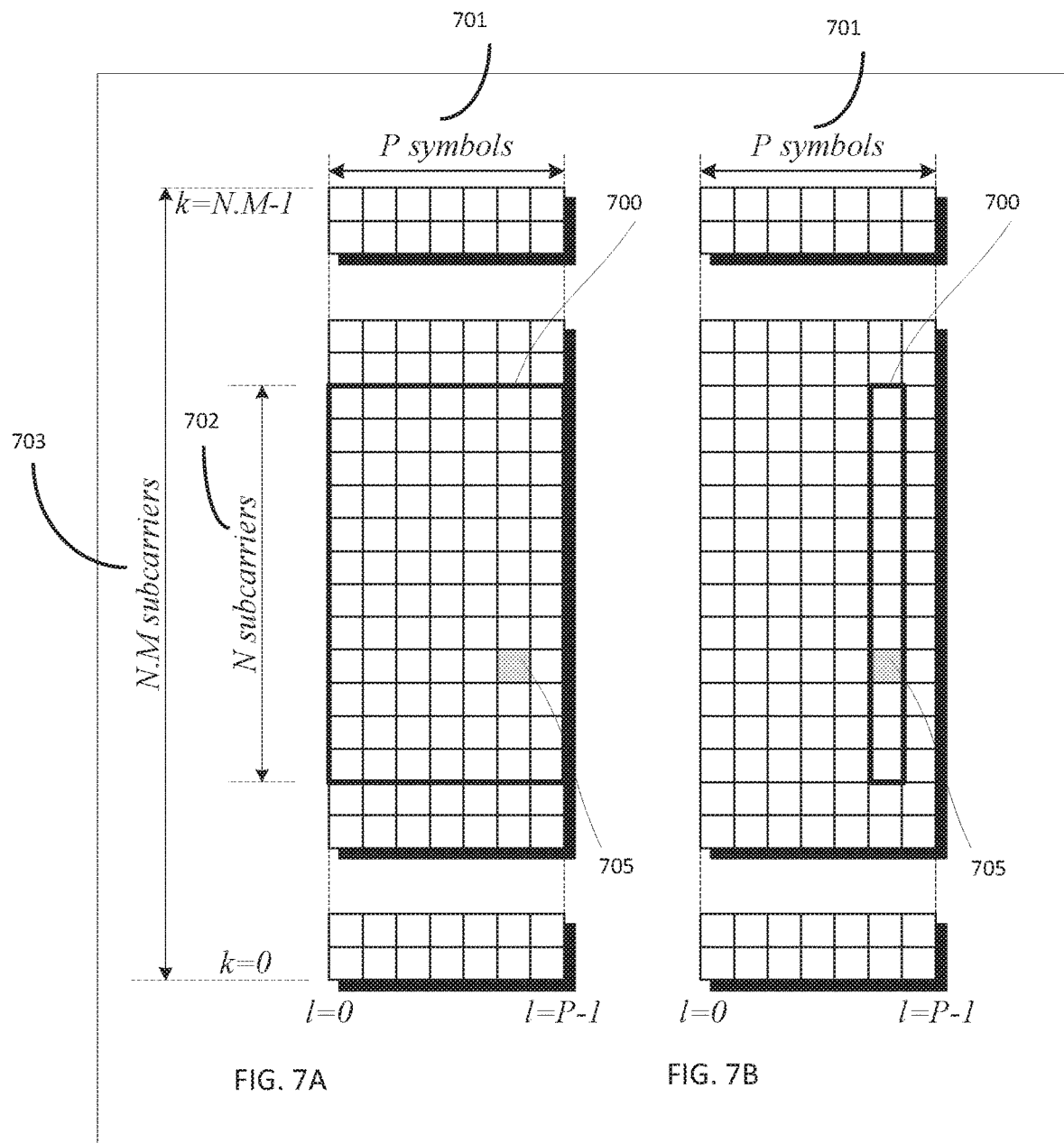
FIG. 7A and FIG. 7B illustrate example frequency resources in accordance with some embodiments.

FIG. 6 illustrates an example of a radio frame structure in accordance with some embodiments. FIGS. 7A and 7B illustrate example frequency resources in accordance with some embodiments. In references herein, "FIG. 7" may include FIG. 7A and FIG. 7B. It should be noted that the examples shown in FIGS. 6-7 may illustrate some or all of the concepts and techniques described herein in some cases, but embodiments are not limited by the examples. For instance, embodiments are not limited by the name, number, type, size, ordering, arrangement and/or other aspects of the time resources, symbol periods, frequency resources, PRBs and other elements as shown in FIGS. 6-7. Although some of the elements shown in the examples of FIGS. 6-7 may be included in a 3GPP LTE standard, 5G standard, NR standard and/or other standard, embodiments are not limited to usage of such elements that are included in standards.

An example of a radio frame structure that may be used in some aspects is shown in FIG. 6. In this example, radio frame 600 has a duration of 10 ms. Radio frame 600 is divided into slots 602 each of duration 0.5 ms, and numbered from 0 to 19. Additionally, each pair of adjacent slots 602 numbered 2i and 2i+1, where i is an integer, is referred to as a subframe 601.

In some aspects using the radio frame format of FIG. 6, each subframe 601 may include a combination of one or more of downlink control information, downlink data information, uplink control information and uplink data information. The combination of information types and direction may be selected independently for each subframe 602.

Referring to FIGS. 7A and 7B, in some aspects, a sub-component of a transmitted signal consisting of one subcarrier in the frequency domain and one symbol interval in the time domain may be termed a resource element. Resource elements may be depicted in a grid form as shown in FIG. 7A and FIG. 7B.

In some aspects, illustrated in FIG. 7A, resource elements may be grouped into rectangular resource blocks 700 consisting of 12 subcarriers in the frequency domain and the P symbols in the time domain, where P may correspond to the number of symbols contained in one slot, and may be 6, 7, or any other suitable number of symbols.

In some alternative aspects, illustrated in FIG. 7B, resource elements may be grouped into resource blocks 700 consisting of 12 subcarriers (as indicated by 702) in the frequency domain and one symbol in the time domain. In the depictions of FIG. 7A and FIG. 7B, each resource element 705 may be indexed as (k, l) where k is the index number of subcarrier, in the range 0 to N.M-1 (as indicated by 703), where N is the number of subcarriers in a resource block, and M is the number of resource blocks spanning a component carrier in the frequency domain.

In accordance with some embodiments, the UE 102 may be configured for sidelink operation in accordance with a carrier aggregation (CA) of a plurality of component carriers (CCs). The UE 102 may select one or more of the CCs of the plurality of CCs for transmission of a sidelink synchronization signal (SLSS) and a physical sidelink broadcast channel (PSBCH). The UE 102 may transmit the SLSS on each of the selected CCs, and in a subframe. The SLSS may be for synchronization by other UEs 102 for the sidelink operation. The UE 102 may encode the PSBCH for transmission on the one or more selected CCs in the same subframe used for transmission of the SLSS. The PSBCH may be encoded to include a plurality of parameters related to the sidelink operation. The plurality of parameters may be propagated across all of the CCs of the plurality of CCs for the sidelink operation. The UE 102 may encode one or more physical sidelink shared channels (PSSCHs) for transmission in accordance with the carrier aggregation. The PSSCHs may be encoded for transmission on the plurality of CCs in accordance with the plurality of parameters propagated across the plurality of CCs. These embodiments are described in more detail below.

Figure 8:
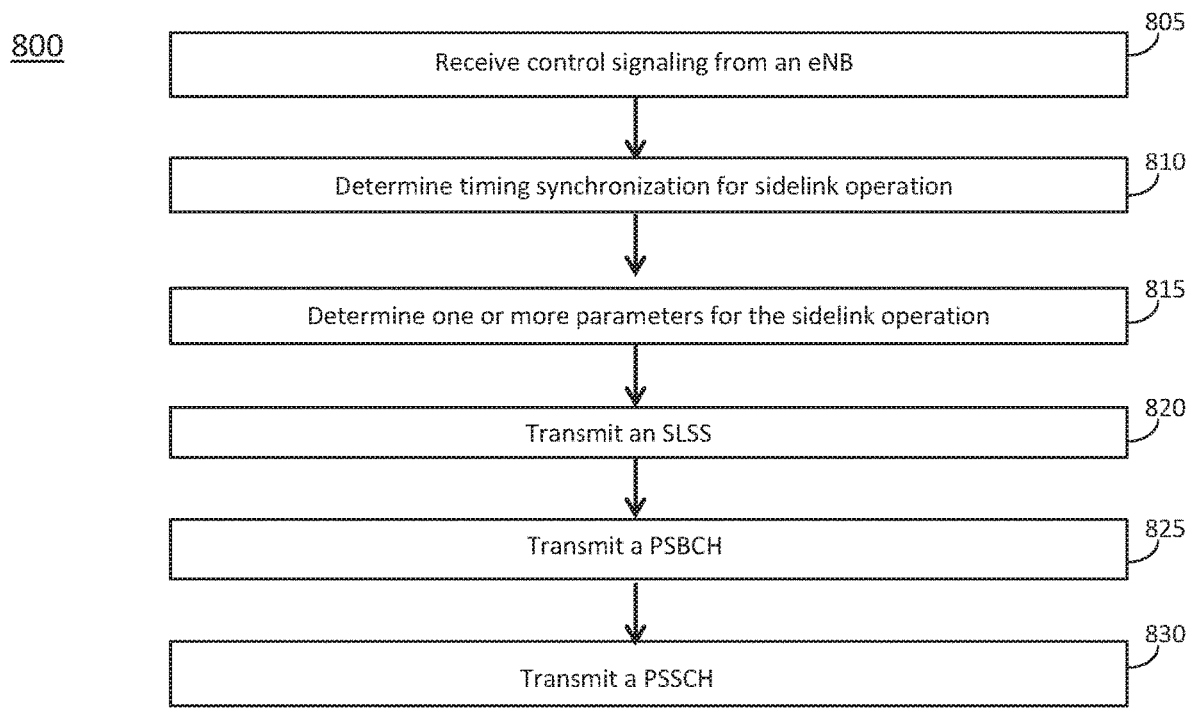
FIG. 8 illustrates the operation of a method of communication in accordance with some embodiments.

FIG. 8 illustrates the operation of a method of communication in accordance with some embodiments. It is important to note that embodiments of the methods 800, 900 may include additional or even fewer operations or processes in comparison to what is illustrated in FIG. 8. In addition, embodiments of the methods 800, 900 are not necessarily limited to the chronological order that is shown in FIG. 8. In describing the method 800, reference may be made to one or more figures, although it is understood that the method 800 may be practiced with any other suitable systems, interfaces and components.

In some embodiments, a UE 102 may perform one or more operations of the method 800, but embodiments are not limited to performance of the method 800 and/or operations of it by the UE 102. In some embodiments, another device and/or component may perform one or more operations of the method 800. In some embodiments, another device and/or component may perform one or more operations that may be similar to one or more operations of the method 800. In some embodiments, another device and/or component may perform one or more operations that may be reciprocal to one or more operations of the method 800. In a non-limiting example, the gNB 105 may perform an operation that may be the same as, similar to, reciprocal to and/or related to an operation of the method 800, in some embodiments.

It should be noted that one or more operations of the method 800 may be the same as, similar to and/or reciprocal to one or more operations of the other method. In a non-limiting example, an operation of the method 800 may include reception of an element (such as a frame, block, message and/or other) by the UE 102, and an operation of another method may include transmission of a same element (and/or similar element) by the gNB 105. In some cases, descriptions of operations and techniques described as part of the method 800 may be relevant to another method.

The method 800 and other methods described herein may refer to eNBs 104, gNBs 105 and/or UEs 102 operating in accordance with 3GPP standards, 5G standards, NR standards and/or other standards. However, embodiments are not limited to performance of those methods by those components, and may also be performed by other devices, such as a Wi-Fi access point (AP) or user station (STA). In addition, the method 800 and other methods described herein may be practiced by wireless devices configured to operate in other suitable types of wireless communication systems, including systems configured to operate according to various IEEE standards such as IEEE 802.11. The method 800 may also be applicable to an apparatus of a UE 102, an apparatus of an eNB 104, an apparatus of a gNB 105 and/or an apparatus of another device described above.

It should also be noted that embodiments are not limited by references herein (such as in descriptions of the method 800 and/or other descriptions herein) to transmission, reception and/or exchanging of elements such as frames, messages, requests, indicators, signals or other elements. In some embodiments, such an element may be generated, encoded or otherwise processed by processing circuitry (such as by a baseband processor included in the processing circuitry) for transmission. The transmission may be performed by a transceiver or other component, in some cases. In some embodiments, such an element may be decoded, detected or otherwise processed by the processing circuitry (such as by the baseband processor). The element may be received by a transceiver or other component, in some cases. In some embodiments, the processing circuitry and the transceiver may be included in a same apparatus. The scope of embodiments is not limited in this respect, however, as the transceiver may be separate from the apparatus that comprises the processing circuitry, in some embodiments.

One or more of the elements (such as messages, operations and/or other) described herein may be included in a standard and/or protocol, including but not limited to Third Generation Partnership Project (3GPP), 3GPP Long Term Evolution (LTE), Fourth Generation (4G), Fifth Generation (5G), New Radio (NR) and/or other. Embodiments are not limited to usage of those elements, however. In some embodiments, other elements may be used, including other element(s) in a same standard/protocol, other element(s) in another standard/protocol and/or other. In addition, the scope of embodiments is not limited to usage of elements that are included in standards.

At operation 805 the UE 102 may receive control signaling. At operation 810 the UE 102 may determine timing synchronization for sidelink operation. At operation 815 the UE 102 may determine one or more parameters for the sidelink operation. At operation 820 the UE 102 may transmit an SLSS. At operation 825 the UE 102 may transmit a PSBCH. At operation 830 the UE 102 may transmit a PSSCH.

In some embodiments, the control signaling may include parameters, information and/or other elements related to one or more of: sidelink communication, sidelink operation, carrier aggregation, time resources for transmission/reception of one or more elements, frequency resources for transmission/reception of one or more elements, and/or other.

In some embodiments, the UE 102 may be configured for sidelink operation in accordance with a carrier aggregation (CA) of a plurality of component carriers (CCs). In some embodiments, the UE 102 may select one or more of the CCs of the plurality of CCs for transmission of a sidelink synchronization signal (SLSS) and a physical sidelink broadcast channel (PSBCH). In some embodiments, the UE 102 may encode the SLSS for transmission on each of the selected CCs in a subframe, wherein the SLSS is for synchronization by other UEs 102 for the sidelink operation. In some embodiments, the UE 102 may encode the PSBCH for transmission on each of the selected CCs in the same subframe used for transmission of the SLSS, wherein the PSBCH is encoded to include a plurality of parameters related to the sidelink operation, wherein the plurality of parameters is to be propagated across all of the CCs of the plurality of CCs for the sidelink operation. In some embodiments, the UE 102 may encode one or more physical sidelink shared channels (PSSCHs) for transmission in accordance with the carrier aggregation, wherein the PSSCHs are encoded for transmission on the plurality of CCs in accordance with the plurality of parameters propagated across the plurality of CCs.

Embodiments are not limited to selection of one or more of the CCs of the plurality of CCs for transmission of the SLSS and the PSBCH, and are also not limited to selection of one of the CCs of the plurality of CCs for transmission of the SLSS and the PSBCH. In some embodiments, a technique, operation and/or method described herein that is based on selection of one of the CCs may be modified to be based on selection of one or more of the CCs. In some embodiments, a technique, operation and/or method described herein that is based on selection of one or more of the CCs may be modified to be based on selection of one of the CCs.

In some embodiments, the plurality of parameters related to the sidelink operation may include one or more of: a pre-configured bandwidth parameter of the one or more selected CCs, a pre-configured time-division duplexing (TDD) configuration parameter of the selected CC, an in-coverage parameter, and a direct frame number (DFN) parameter.

In some embodiments, the UE 102 may determine timing synchronization for the sidelink operation based on signaling received from the eNB 104. In some embodiments, the UE 102 may derive the in-coverage parameter and the DFN parameter based on the signaling received from the eNB 104. In some embodiments, the UE 102 may determine timing synchronization for the sidelink operation based on signaling received from another UE 102. In some embodiments, the UE 102 may determine the DFN parameter based on signaling received from another UE 102.

In some embodiments, the UE 102 may determine timing synchronization for the sidelink operation based on one or more received global navigation satellite system (GNSS) signals. In some embodiments, the UE 102 may determine the DFN parameter based on the determined timing synchronization for the sidelink operation and a pre-configured DFN offset parameter.

In some embodiments, the bandwidth parameter may indicate a bandwidth in terms of a number of resource blocks (RBs). In some embodiments, the TDD configuration parameter may indicate a TDD specific physical channel configuration. In some embodiments, the in-coverage parameter may indicate whether the UE 102 is in Evolved Universal Mobile Telecommunications Service (UMTS) Terrestrial Radio Area Network (E-UTRAN) coverage. In some embodiments, the DFN parameter for the selected CC may indicate a frame number in which the SLSS and SLBCH are transmitted.

In some embodiments, the UE 102 may encode a master information block (MIB) for inclusion in the PSBCH. In some embodiments, the UE 102 may encode the MIB to include the plurality of parameters related to the sidelink operation.

In some embodiments, the MIB may be a MasterInformationBlock-SL or a MasterInformationBlock-SL-V2X. In some embodiments, the plurality of parameters related to the sidelink operation may include one or more of: a pre-configured sl-Bandwidth parameter for the selected CC, a pre-configured tdd-config parameter for the selected CC, an in-coverage parameter, and a direct frame number (DFN) parameter.

In some embodiments, the UE 102 may encode the PSBCH to include an SLSS identifier (SLSS-ID) that is to be propagated across all of the CCs of the plurality of CCs for the sidelink operation.

In some embodiments, the UE 102 may encode the PSBCH to include an indicator of whether the plurality of parameters is to be propagated across all of the CCs of the plurality of CCs for the sidelink operation.

In some embodiments, the UE 102 may select the CC for transmission of the SLSS and the PSBCH based on a tie-breaking rule that is based on or more of: an SLSS CA indication flag, and one or more sidelink reference signal received power (SL-RSRP) measurements of the CCs of the plurality of CCs.

In some embodiments, the UE 102 may determine if reselection of the CC or transmission of the SLSS and the PSBCH is to be triggered when: a currently used SLSS is lost at a used CC, all synchronization sources which provide global navigation satellite system (GNSS) or network timing are lost at the selected CC, or the UE 102 has not detected an SLSS source at the selected CC.

In some embodiments, the UE 102 may periodically reselect one of the CCs of the plurality of CCs for transmission of the SLSS and the PSBCH in accordance with a period. In some embodiments, the period may be preconfigured by a network, predefined by a protocol, or determined autonomously based on SLSS detection statistics.

In some embodiments, the UE 102 may encode the SLSS for transmission on: the selected CC, or all of the CCs of a set-B that includes the selected CC.

In some embodiments, the plurality of CCs may include a synchronization set of CCs. In some embodiments, the UE 102 may encode the SLSS for transmission in accordance with one of: selection of a subset of the CCs of the synchronization set, and periodic transmission of the SLSS on the CCs of the subset, selection of one of the CCs of the synchronization set, and periodic transmission on the selected CC, cyclic switching across the CCs of the synchronization set, or iterative switching of CC groups In some embodiments, an apparatus of a UE 102 may comprise memory. The memory may be configurable to store information related to the one or more of the CCs. The memory may store one or more other elements and the apparatus may use them for performance of one or more operations. The apparatus may include processing circuitry, which may perform one or more operations (including but not limited to operation(s) of the method 800 and/or other methods described herein). The processing circuitry may include a baseband processor. The baseband circuitry and/or the processing circuitry may perform one or more operations described herein, including but not limited to encoding of the SLSS and the PSBCH. The apparatus may include a transceiver to transmit the SLSS and the PSBCH. The transceiver may transmit and/or receive other blocks, messages and/or other elements.

Figure 9:
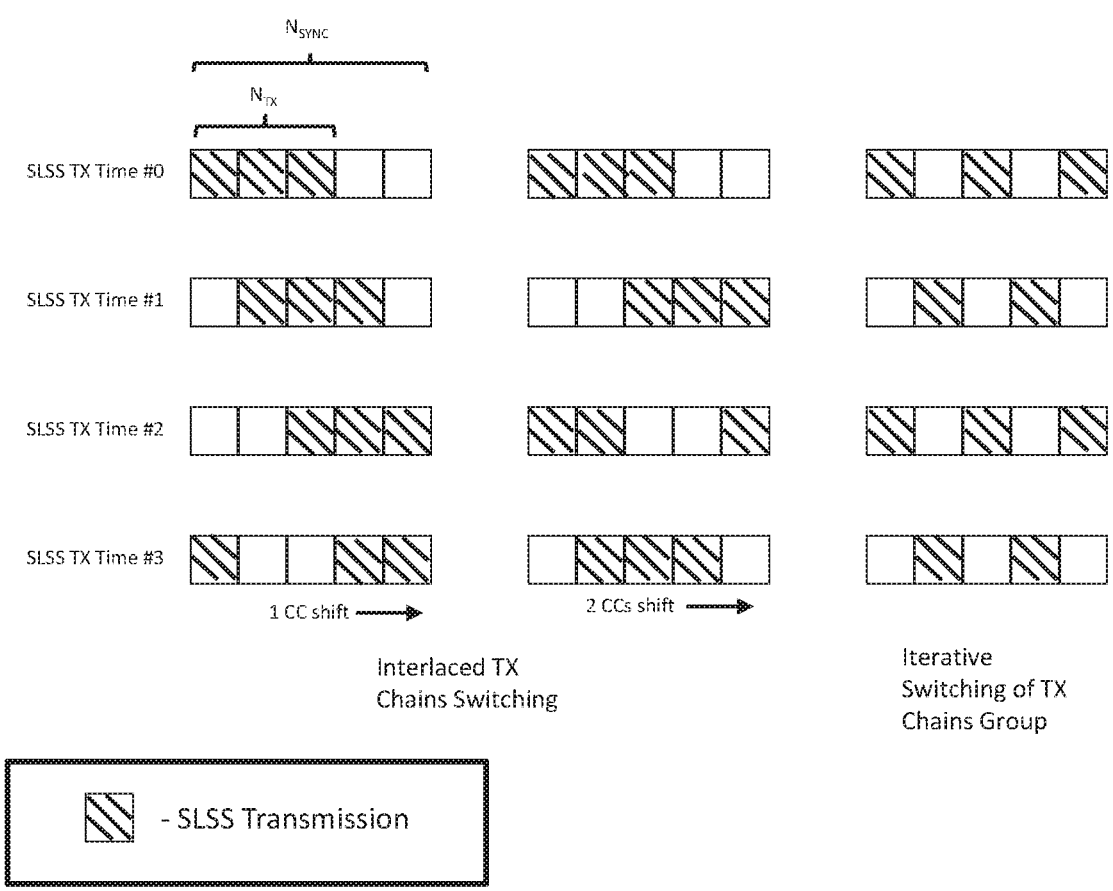
FIG. 9 illustrates example synchronization options in accordance with some embodiments.

FIG. 9 illustrates example elements in accordance with some embodiments. It should be noted that the examples shown in FIG. 9 may illustrate some or all of the concepts and techniques described herein in some cases, but embodiments are not limited by the examples. For instance, embodiments are not limited by the name, number, type, size, ordering, arrangement of elements (such as devices, operations, messages and/or other elements) shown in FIG. 9. Although some of the elements shown in the examples of FIG. 9 may be included in a 3GPP LTE standard, 5G standard, NR standard and/or other standard, embodiments are not limited to usage of such elements that are included in standards.

Sidelink based V2V communication was introduced in LTE R14. The technology enables synchronization using various sidelink synchronization sources including GNSS, eNB 104 and UEs 102. When the UE 102 serves as a synchronization source it periodically once per 160 ms broadcasts sidelink synchronization signals (SLSS). The UE 102 serving as a synchronization source may: derive it its own timing from eNB 104/GNSS; derive its timing from other UEs 102 deriving timing from GNSS or network; serve as an independent synchronization source; and/or other. The LTE R14 specification defines synchronization source selection rules in order to determine which synchronization source should be used by the UE 102 as a synchronization reference. The synchronization procedure defined in LTE R14 is defined and operates independently per each component carrier. In LTE R15, the sidelink carrier aggregation was introduced.

In some embodiments, a modification of the LTE V2X sidelink synchronization procedure developed in R14 may be performed. In some cases, such a modification may make the procedure suitable for sidelink carrier aggregation being enabled in LTE R15. One or more of the following may be addressed in some of the embodiments described herein: UE SLSS/PSBCH transmission behavior in case of limited number of TX chains; PSBCH content modification; sidelink synchronization carrier and sidelink synchronization source (re)-selection; and/or other.

In some embodiments, one or more of the following may be used (as part of a multi-carrier sidelink synchronization procedure, in some cases, although the scope of embodiments is not limited in this respect): updated PSBCH content with new field to indicate whether sidelink synchronization may be propagated across aggregated component carriers (CCs) for sidelink transmission/reception; additional tie-breaking rule used in synchronization carrier selection procedure to select synchronization carrier with the most appropriate and reliable synchronization source is specified; synchronization carrier and sidelink synchronization source (re)-selection procedure details, synchronization signal transmission behavior for the case when number of Set-B CCs is larger than the number of TX chains; and/or other.

In some embodiments, higher layers can configure set of carrier(s) (Set-A) that can potentially be used as the synchronization carrier for the potential carriers configured for Tx and Rx for CA. If this set is empty, Rel-14 independent synchronization may be used per carrier. Carriers can be aggregated if they use the same synchronization reference (e.g. GNSS, or same eNB 104). If this set is non-empty: Set-A must be a subset of the set of potential carriers configured for Tx and Rx for CA; and UE 102 determines the available set of synchronization carriers (Set-B) as the subset of Set-A based on the carriers which the UE is currently aggregating. Within the Set-B of available set of synchronization carriers: if no potential synchronization carrier is present, Rel-14 behavior of independent synchronization per carrier is assumed; if only one potential synchronization carrier is present, UE 102 may (and/or shall) use derive time/frequency of all the aggregated carriers from the synchronization reference of the synchronization carrier; if two or more potential synchronization carriers are present, various techniques may be used for how the UE 102 selects one of the carrier to be used as the synchronization carrier.

In some embodiments, from the transmitting UE 102 perspective, a single synchronization reference is used for all aggregated carriers. From the receiving UE 102 perspective, a single synchronization reference is used for reception of all aggregated carriers. If two or more potential synchronization carriers are present in Set-B, select the carrier in Set-B with highest Rel-14 priority sync reference. The carrier is not reselected unless synchronization is lost. Rel-14 procedure applies to the selected carrier.

The UE 102 may be configured one of the following options: SLSS is transmitted (based on Rel-14 procedure) on selected sync carrier from Set-B; SLSS is transmitted on all carriers from Set-B; and/or other.

Some embodiments may relate to physical sidelink broadcast channel (PSBCH) and/or sync propagation across carriers. In some embodiments, a new field in the PSBCH payload may be used. In order to extend sidelink synchronization procedure for sidelink CA operation, the content of PSBCH may be extended with an additional field. This new field may indicate whether the UE 102 receiving this PSBCH and SLSS can propagate the derived timing across aggregated component carriers. If this field is set (for instance), it may indicate that the UE 102 can propagate derived timing across aggregated CCs for transmission/reception of PSBCH/SLSS or other sidelink channels (PSCCH/PSSCH). The new field (which may be an "SLSS CA Indication Flag," a similar flag and/or other parameter) may be used to inform receivers whether a given PSBCH/SLSS is applicable for sidelink CA and thus synchronization can be propagated across CCs.

In some cases, this new indication may be needed in order to avoid wrong propagation of the R14 timing across aggregated CCs (given that R14 sidelink synchronization procedure is running independently per each CC and each R14 CC may potentially have different amount of synchronization resources, different sync source priority rules, different timing, etc.). In general, it may be possible to align synchronization configuration among R14 and R15 UEs 102, however at least for out of coverage operation it seems that additional indication may be desirable.

In some cases, this new field may be defined by using one of the reserved bits of the PSBCH payload (Sidelink Master Information Block—V2X). If inter component carrier synchronization configurations are aligned across R14 and R15 UEs 102, the corresponding field may be even preconfigured for R14 UEs 102—sync sources so that their SLSS timing can be also propagated by R15 UEs 102 across component carrier in case if both UE 102 types R14 and R15 operate on the same synchronization carrier.

Some embodiments may be related to SLSS ID and/or PSBCH content propagation. In some cases of sidelink CA operation, the same timing derived from the reference synchronization source at component carrier serving as a synchronization reference may be used disregarding the SLSS ID and PSBCH content propagation details. Some SLSS ID and PSBCH content propagation options are described below, and may be described elsewhere herein.

Regarding SLSS ID propagation, one or more of the following may be performed in some embodiments: a same SLSS ID may be configured across aggregated component carriers; a same SLSS ID derived from synchronization source of reference synchronization carrier may be propagated across aggregated component carriers; at each CC in which synchronization is propagated, the SLSS ID may be taken according to pre-configuration information or derived independently based on synchronization sources detected at corresponding CCs (e.g. following sync source priority rules); and/or other.

In some embodiments, a PSBCH payload may include one or more of the following fields: System bandwidth, TDD configuration, In-Coverage flag, DFN value, reserved field(s) and/or other. The first two fields (System bandwidth, TDD configuration) are CC-specific and could not be modified. Each of the latter two PSBCH fields (In-Coverage flag and DFN value) may be propagated following one or more of the following principles for SLSS ID propagation: a same PSBCH field value is configured across aggregated component carriers; a same PSBCH field value is derived from reference synchronization source propagated across aggregated component carriers; at each CC in which synchronization is propagated, the PSBCH field value is derived based on pre-configuration information or derived independently based on synchronization sources detected from each corresponding CCs (e.g. following sync source priority rules).

In some embodiments, for sidelink CA, the synchronization carriers can be represented by two sets: Set-A (set of potential sync carriers) and Set-B (subset of sync carriers determined by UE based on aggregated CCs). In a non-limiting example, a synchronization carrier selection procedure may not necessarily specify UE behavior for cases in which two or more carriers in Set-B have the same sync source priority. In some cases, including but not limited to those described in the above example, in order to select synchronization source, one or more additional tie breaking rules may be used.

In some embodiments, such a tie breaking rule may utilize information including but not limited to one or more of the following: a PSBCH "SLSS CA Indication Flag," wherein an R15 UE may prioritize selection of synchronization CC which SLSS may be propagated across aggregated component carrier, an SL-RSRP measurement; wherein in some cases, the UE 102 may apply SL-RSRP criteria to select synchronization CC (e.g. select CC with higher SL-RSRP measured over DMRS of PSBCH or SLSS itself).

In some embodiments, a sidelink synchronization carrier reselection trigger may be used. In a previous agreement related to one or more 3GPP specifications: "If two or more potential synchronization carriers are present in Set-B, UE selects the carrier in Set-B with the highest Rel-14 priority sync reference. Carrier is not reselected unless synchronization is lost. Rel-14 procedure applies to the selected carrier". According to this agreement, the event when "synchronization is lost" should be specified in more details to clearly determine the moment, when synchronization carrier (Sync-CC) (re)selection should be triggered. The following options and/or additional option(s) are possible. The following options may be referred to as "option 1," "option 2," and "option 3" for clarity, but such references are not limiting. In option 1, sync-CC (re)-selection is triggered when currently used SLSS is lost at the used CC. In option 2, sync-CC (re)-selection is triggered when all synchronization sources which provide GNSS or network timing are lost at the selected sidelink synchronization CC. In option 3, sync-CC (re)-selection is triggered when UE has not detected any SLSS source at the selected sidelink synchronization CC.

While option 1 may be most straightforward, it may result in significant scanning complexity and overhead caused by synchronization signal detection that should be executed at each CC from Set-B. In option 3, the synchronization source (re)-selection overhead/complexity is minimized. However, in this case, the UE 102 may propagate for a very long time synchronization signal originated by, for example, low priority independent synchronization source while synchronization source of higher priority (which use GNSS or network timing) may exist at other synchronization carrier of Set B. Option 2 may provide a reasonable compromise between Sync-CC reselection overhead and used synchronization source quality (which is associated with assigned priority), in some cases.

In some embodiments, if sync-CC reselection results in high priority synchronization source selection, the selected source may be kept as reference for a long time. However, if the UE 102 selects low priority sync source or becomes independent synchronization source (i.e. sync source with lowest priority), triggering of additional Sync-CC reselection may be used and/or needed to check whether higher priority sidelink synchronization sources that exist at other Set-B CCs and synchronization carrier should be (re)-selected.

In some embodiments, sync-CC (re)selection may be periodically triggered. Example alternatives (which may be referred to as "alternative 1" and "alternative" for clarity, without limitation) for definition of the sync-CC reselection period are given below. Additional alternatives are possible, in some embodiments. In alternative 1, a fixed sync carrier reselection period is used irrespective of the type of currently used SLSS (i.e. sync source priority). In alternative 2, the sync carrier reselection period depends on synchronization source priority currently used by the UE 102. In this case, the lower priority of the used synchronization source, the more frequently sync-CC reselection is triggered and not triggered at all for some of the sync source priority level (e.g. highest SLSS priority).

In some embodiments, the period may be preconfigured by the network, predefined by specification, determined by the UE 102 autonomously based on SLSS detection statistics and/or based on one or more other techniques. Additionally, if UEs 102 have multiple RX chains that are capable to monitor SLSS on multiple CCs, the UE 102 may monitor multiple CCs for SLSS sync sources and may be able to reselect sync carrier if the higher priority sync source is detected.

In some cases, according to the previous agreements, the UE 102 may be configured to use one of the following SLSS transmission options (which are referred to below as "option 1b" and "option 2b" for clarity, without limitation). In option 1b, the SLSS is transmitted (based on Rel-14 procedure) on selected sync carrier from Set-B. In option 2b, the SLSS is transmitted on all carriers from Set-B.

In some scenarios, a number of UE TX chains ($N_{TX}$) may be less than a number of synchronization carriers ($N_{SYNC}$). In this case, a UE 102 with limited TX chain capabilities may need to switch TX chain in order to transmit SLSS. One or more of the following TX PSBCH/SLSS transmission options (and/or other options) may be used. The options may be referred to as "option 0c," "option 1c," "option 2c," and "option 3c" for clarity, but such references are not limiting.

In option 0c, the UE 102 may transmit on $N_{TX}$ out of $N_{SYNC}$ CCs. In this case, the UE 102 may autonomously select $N_{Tx}$ out of $N_{SYNC}$ CCs and may periodically transmit SLSS on the selected $N_{TX}$ CCs of the Set B.

In option 1c, the UE 102 may transmit on 1 out of $N_{SYNC}$ CCs. In this case, the UE 102 may autonomously select one out of $N_{SYNC}$ CCs and may periodically transmit SLSS on the selected CC of the Set B.

In option 2c, cyclic switching of $N_{TX}$ chains across $N_{SYNC}$ CCs of Set-B CCs may be used. In this case, $N_{Tx}$ TX chains may be used at each SLSS transmission time instance (SLSS TX Time#i) to transmit SLSS. Different cyclically shifted sets of $N_{TX}$ CCs out of $N_{SYNC}$ CCs may be used at each SLSS transmission time instance for SLSS transmission as it is shown in FIG. 9. Cyclic shift of sync CCs for SLSS transmission may enable SLSS transmission across all $N_{SYNC}$ CCs. The specific set of CCs for SLSS transmission may be dependent on SLSS IDs configured per CC and DFN of synchronization resources.

In option 3c, iterative switching of CC groups may be used. In this case, groups of TX chains used for SLSS transmission of maximum $N_{TX}$ size may be formed. As it is shown in FIG. 9, two groups of TX chains may be created. In the example in FIG. 9, the first group includes 3 TX chains and is used for SLSS transmission at SLSS TX Time#0 and SLSS TX Time#2. The second group includes 2 TX chains and is used for SLSS transmission at SLSS TX Time#1 and SLSS TX Time#3.

In some cases, the retuning of TX chain for SLSS transmission on another CC may be in conflict with parallel PSCCH/PSSCH transmission on a given carrier (depending on switching time). In this case, prioritization of PSCCH/PSSCH over SLSS/PSBCH transmission on synchronization carrier should be defined. In general, the UE 102 may transmit SLSS only on component carrier(s) with active PSCCH/PSSCH transmissions and do not switch TX chain solely for SLSS transmission on aggregated CCs.

In some embodiments, a method of sidelink synchronization procedure across multiple aggregated sidelink component carriers (CCs) may comprise one or more of: transmission, by the UE 102, of sidelink synchronization signal (SLSS); reception, by the UE 102 of SLSS; selection, by the UE 102, of a synchronization source and a component carrier with high priority synchronization signal to derive transmission timing for all CCs using common synchronization reference; selection, by the UE 102, of a synchronization source and component carrier with high priority synchronization signal to derive reception timing for all CCs using common synchronization reference; selection, by the UE 102, of resources for synchronization signal transmission; and/or other.

In some embodiments, the SLSS transmitter may inform SLSS receivers whether receiver may propagate particular SLSS timing across aggregated CCs. In some embodiments, the transmitter may inform the receiver using additional field in PSBCH. In some embodiments, the UE 102 may receive PSBCH and may use additional bit in PSBCH to decide, whether received SLSS may be propagated across aggregated CCs. In some embodiments, R14 PSBCH payload reserved bits may be used for signaling. In some embodiments, R14 sidelink synchronization resources configuration at multiple carriers may be aligned with R15 sidelink synchronization resources configuration. In some embodiments, PSBCH payload reserved bits may be preconfigured in a way to allow R15 receivers to propagate timing across CCs. In some embodiments, same SLSS ID and/or PSBCH content fields may be configured across aggregated component carriers. In some embodiments, same SLSS ID and/or PSBCH content fields may be used at all CCs and derived from reference synchronization source propagated across aggregated component carriers. In some embodiments, different SLSS ID or PSBCH content fields may be derived based on pre-configuration information or derived independently based on synchronization sources detected from each corresponding CCs (e.g. following sync source priority rules). In some embodiments, the UE 102 may detect multiple synchronization sources of same priority at different carriers. In some embodiments, the UE 102 may use additional tie breaking rule(s) to select single synchronization source. In some embodiments, the following information may be used to select synchronization source: a PSBCH "SLSS CA Indication Flag"; an SL-RSRP measurement; and/or other.

In some embodiments, synchronization carrier reselection may be triggered when at least one of the following events occurs: when currently used SLSS is lost at the used CC; when all synchronization sources which provide GNSS or network timing are lost at the selected sidelink synchronization CC; when the UE 102 has not detected any SLSS source at the selected sidelink synchronization CC; and/or other.

In some embodiments, resource reselection may be additionally triggered to check whether higher priority sidelink synchronization sources exist at other Set-B CCs and synchronization carrier should be (re)-selected. In some embodiments, additional synchronization carrier reselection may be periodically triggered. In some embodiments, a fixed reselection period may be used irrespective of the type of currently used SLSS (i.e. sync source priority). In some embodiments, a reselection period may depend on synchronization source priority currently used by the UE 102. In some embodiments, a period may be preconfigured by network, predefined by specification or may be determined by UE 102 autonomously based on SLSS detection statistics. In some embodiments, the UE 102 may have a number of TX chains ($N_{Tx}$) less than the number of synchronization carriers ($N_{SYNC}$). In some embodiments, the UE 102 may autonomously select $N_{Tx}$ out of $N_{SYNC}$ CCs and periodically transmit SLSS on selected $N_{TX}$ CCs of the Set B. In some embodiments, the UE 102 may autonomously select one out of $N_{SYNC}$ CCs and periodically transmit SLSS on selected CC of the Set B. In some embodiments, cyclic switching of $N_{TX}$ chains across $N_{SYNC}$ CCs of Set-B CCs may be used to determine the set of active CCs at each SLSS TX time instance. In some embodiments, iterative switching of a CCs groups may be used to determine the set of active CCs at each SLSS TX time instance.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a User Equipment (UE) configured for sidelink operation in accordance with a carrier aggregation (CA) of a plurality of component carriers (CCs), the apparatus comprising:
one or more processors, configured to:
select one or more CCs of the plurality of CCs for transmission of a sidelink synchronization signal (SLSS) and a physical sidelink broadcast channel (PSBCH);
encode the SLSS for transmission on each of selected CCs in a subframe, wherein the SLSS is for synchronization by other UEs for the sidelink operation;
encode the PSBCH for transmission on the selected CCs in the same subframe used for transmission of the SLSS, wherein the PSBCH is encoded to include a plurality of parameters related to the sidelink operation, wherein the plurality of parameters is to be propagated across all of the CCs of the plurality of CCs for the sidelink operation; and
encode one or more physical sidelink shared channels (PSSCHs) for transmission in accordance with the carrier aggregation, wherein the PSSCHs are encoded for transmission on the plurality of CCs in accordance with the plurality of parameters propagated across the plurality of CCs;
perform transmission on the plurality of CCs in accordance with the plurality of parameters.

2. The apparatus according to claim 1, wherein the plurality of parameters related to the sidelink operation includes:
a pre-configured bandwidth parameter of the selected CCs,
a pre-configured time-division duplexing (TDD) configuration parameter of the selected CCs,
an in-coverage parameter, and
a direct frame number (DFN) parameter.

3. The apparatus according to claim 2, wherein the one or more processors are further configured to:
determine timing synchronization for the sidelink operation based on signaling received from a base station; and
derive the in-coverage parameter and the DFN parameter based on the signaling received from the base station.

4. The apparatus according to claim 2, wherein the one or more processors are further configured to:
receive one or more global navigation satellite system (GNSS) signals;
determine timing synchronization for the sidelink operation based on the one or more GNSS signals; and
determine the DFN parameter based on the determined timing synchronization for the sidelink operation and a pre-configured DFN offset parameter.

5. The apparatus according to claim 2, wherein the one or more processors are further configured to:
determine timing synchronization for the sidelink operation based on signaling received from another UE; and
determine the DFN parameter based on signaling received from the other UE.

6. The apparatus according to claim 2, wherein:
the bandwidth parameter indicates a bandwidth in terms of a number of resource blocks (RBs),
the TDD configuration parameter indicates a TDD specific physical channel configuration,
the in-coverage parameter indicates whether the UE is in Evolved Universal Mobile Telecommunications Service (UMTS) Terrestrial Radio Area Network (E-UTRAN) coverage, and
the DFN parameter for the selected CCs indicates a frame number in which the SLSS and SLBCH are transmitted.

7. The apparatus according to claim 1, wherein the one or more processors are further configured to:
encode a master information block (MIB) for inclusion in the PSBCH, the MIB encoded to include the plurality of parameters related to the sidelink operation.

8. The apparatus according to claim 7, wherein:
the MIB is a MasterinformationBlock-SL or a MasterInformationBlock-SL-V2X
the plurality of parameters related to the sidelink operation includes:
a pre-configured sl-Bandwidth parameter for the selected CCs,
a pre-configured tdd-config parameter for the selected CCs,
an in-coverage parameter, and
a direct frame number (DFN) parameter.

9. The apparatus according to claim 1, wherein the one or more processors are further configured to:
encode the PSBCH to include an SLSS identifier (SLSS-ID) that is to be propagated across all of the CCs of the plurality of CCs for the sidelink operation.

10. The apparatus according to claim 1, wherein the one or more processors are further configured to:
encode the PSBCH to include an indicator of whether the plurality of parameters is to be propagated across all of the CCs of the plurality of CCs for the sidelink operation.

11. The apparatus according to claim 1, wherein the one or more processors are further configured to:
select the CCs for transmission of the SLSS and the PSBCH based on a tie-breaking rule that is based one or more of:
an SLSS CA indication flag, and
one or more sidelink reference signal received power (SL-RSRP) measurements of the CCs of the plurality of CCs.

12. The apparatus according to claim 1, wherein the one or more processors are further configured to:
determine if reselection of the CC or transmission of the SLSS and the PSBCH is to be triggered when:
a currently used SLSS is lost at a used CC,
all synchronization sources which provide global navigation satellite system (GNSS) or network timing are lost at the selected CC, or
the UE has not detected an SLSS source at the selected CC.

13. The apparatus according to claim 1, wherein the one or more processors are further configured to:
periodically reselect one of the CCs of the plurality of CCs for transmission of the SLSS and the PSBCH in accordance with a period,
wherein the period is preconfigured by a network, predefined by a protocol, or determined autonomously based on SLSS detection statistics.

14. The apparatus according to claim 1, wherein the one or more processors are further configured to:
encode the SLSS for transmission on:
the selected CCs, or
all of the CCs of a set-B that includes the selected CCs.

15. The apparatus according to claim 1, wherein:
the plurality of CCs includes a synchronization set of CCs,
the processing circuitry further configured to encode the SLSS for transmission in accordance with one of:
selection of a subset of the CCs of the synchronization set, and periodic transmission of the SLSS on the CCs of the subset,
selection of one of the CCs of the synchronization set, and periodic transmission on the selected CC,
cyclic switching across the CCs of the synchronization set, or iterative switching of CC groups.

16. The apparatus according to claim 1, wherein:
the apparatus includes a transceiver to transmit the SLSS and the PSBCH, and
the one or more processors include a baseband processor to encode the SLSS and the PSBCH.

17. A non-transitory computer-readable storage medium that stores operations for execution by one or more processors of a User Equipment (UE), the UE configured for sidelink operation on a plurality of component carriers (CCs), the operations to configure the one or more processors to:
select one of the plurality of CCs based on one or more sidelink reference signal received powers (SL-RSRPs);
encode, for transmission on the selected CC, a sidelink synchronization signal (SLSS) to enable synchronization of other UEs for the sidelink operation;
encode, for transmission on the selected CC, a physical sidelink broadcast channel (PSBCH) that includes a master information block (MIB),
encode the MIB to include a plurality of parameters related to the sidelink operation, wherein the plurality of parameters is to be propagated across all of the CCs of the plurality of CCs for the sidelink operation; and
encode one or more physical sidelink shared channels (PSSCHs) for transmission in accordance with the carrier aggregation, wherein the PSSCHs are encoded for transmission on the plurality of CCs in accordance with the plurality of parameters propagated across the plurality of CCs.

18. The non-transitory computer-readable storage medium according to claim 17, wherein the plurality of parameters related to the sidelink operation includes:
a pre-configured bandwidth parameter of the selected CC,
a pre-configured time-division duplexing (TDD) configuration parameter of the selected CC,
an in-coverage parameter,
a direct frame number (DFN) parameter, and
one or more reserved bits.

19. An apparatus of a User Equipment (UE) configured for sidelink operation in accordance with a carrier aggregation (CA) of a plurality of component carriers (CCs), the apparatus comprising:
one or more processors, configured to:
select one of the plurality of CCs;
encode a sidelink synchronization signal (SLSS) for transmission on the selected CC;
encode a physical sidelink broadcast channel (PSBCH) for transmission on the selected CC,
wherein the PSBCH is encoded to include a plurality of parameters related to the sidelink operation, including one or more of: a bandwidth parameter of the selected CC, a time-division duplexing (TDD) configuration parameter of the selected CC, an in-coverage parameter, and a direct frame number (DFN) parameter,
wherein the plurality of parameters is to be propagated across all of the CCs of the plurality of CCs for the sidelink operation; and
encode one or more physical sidelink shared channels (PSSCHs) for transmission in accordance with the carrier aggregation, wherein the PSSCHs are encoded for transmission on the plurality of CCs in accordance with the plurality of parameters propagated across the plurality of CCs.

20. The apparatus according to claim 19, wherein the one or more processors are further configured to:
encode the PSBCH to include an SLSS identifier (SLSS-ID) that is to be propagated across all of the CCs of the plurality of CCs for the sidelink operation.

* * * * *